US007009330B2

(12) United States Patent
Lee

(10) Patent No.: US 7,009,330 B2
(45) **Date of Patent: *Mar. 7, 2006**

(54) COMPOSITION OF PLASMA DISPLAY PANEL

(75) Inventor: Yoon Kwan Lee, Gwangmyeong (KR)

(73) Assignee: LG Electronics Inc., Seoul (KR)

( * ) Notice: Subject to any disclaimer, the term of this patent is extended or adjusted under 35 U.S.C. 154(b) by 57 days.

This patent is subject to a terminal disclaimer.

(21) Appl. No.: 10/750,928

(22) Filed: Dec. 30, 2003

(65) Prior Publication Data

US 2005/0003237 A1 Jan. 6, 2005

(30) Foreign Application Priority Data

Jul. 1, 2003 (KR) ..................... 10-2003-0044340

(51) Int. Cl.
*H01J 17/26* (2006.01)
*B32B 9/00* (2006.01)

(52) U.S. Cl. ................. 313/231.31; 428/336; 428/697; 428/699; 428/690; 428/701; 428/702; 428/426; 501/134; 501/137; 501/139; 252/62.9 R; 252/62.9 PZ; 252/301.4 R; 315/111.71

(58) Field of Classification Search ................ 428/336, 428/697, 699, 690, 701–702, 426; 501/134, 501/137, 139; 252/62.9 R, 62.9 PZ, 302.4 R; 313/231.31; 315/111.71
See application file for complete search history.

(56) References Cited

U.S. PATENT DOCUMENTS 5,309,071 A * 5/1994 Karam et al. ............... 313/509
5,453,661 A * 9/1995 Auciello et al. ............... 315/1
5,757,061 A * 5/1998 Satoh et al. ................ 428/220
6,514,891 B1 * 2/2003 Lee ............................ 501/32
6,605,834 B1 * 8/2003 Lee ............................ 257/295

FOREIGN PATENT DOCUMENTS

GB 2023567 * 1/1980
KR 1020010002339 A 1/2001
KR 1020010036325 A 5/2001

* cited by examiner

*Primary Examiner*—Ling X. Xu
(74) *Attorney, Agent, or Firm*—Lee, Hong, Degerman, Kang & Schmadeka

(57) ABSTRACT

A composition of a plasma display panel (PDP) is disclosed. In order to effectively reduce a jitter, the composition contains a ferroelectric transparent ceramics material.

19 Claims, 3 Drawing Sheets

| FERROELECTRIC | LIGHT TRANSMITTANCE | DIELECTRIC CONSTANT | FERROELECTRIC | LIGHT TRANSMITTANCE | DIELECTRIC CONSTANT |
|---|---|---|---|---|---|
| (Pb,La)-(ZrTi)$O_3$ | 75 - 85 | 1600 | (Pb,La)-(MgNbZrTi)$O_3$ | 100 | 2500 |
| (Pb,Bi)-(ZrTi)$O_3$ | 100 | 2300 | (Pb,Ba)-(LaNb)$O_3$ | 100 | 1700 |
| (Pb,La)-(HfTi)$O_3$ | 75 - 84 | 1300 | (SrBa)-$Nb_2O_3$ | 75 - 85 | 2400 |
| (Pb,Ba)-(ZrTi)$O_3$ | 75 - 80 | 2300 | K(Ta,Nb)$O_3$ | 76 - 87 | 2200 |
| (Pb,Sr)-(ZrTi)$O_3$ | 80 - 85 | 1700 | (Sr,Ba,La)-($Nb_3O_6$) | 80 - 86 | 1900 |
| (Sr,Ca)-(LiNbTi)$O_3$ | 83 - 87 | 3200 | $NaTiO_3$ | 76 - 85 | 1000 |
| $LiTaO_3$ | 75 - 83 | 1200 | $MgTiO_3$ | 70 - 84 | 1100 |
| $SrTiO_3$ | 70 - 80 | 1500 | $BaTiO_3$ | 73 - 84 | 1500 |
| $La_2Ti_2O_7$ | 75 - 83 | 2600 | $SrZrO_3$ | 76 - 83 | 1700 |
| $LiNbO_3$ | 74 - 84 | 1000 | $KNbO_3$ | 75 - 80 | 1100 |

DIELECTRIC CONSTANT : 14

DIELECTRIC CONSTANT : 25

FIG. 3

| FERROELECTRIC | LIGHT TRANSMITTANCE | DIELECTRIC CONSTANT | FERROELECTRIC | LIGHT TRANSMITTANCE | DIELECTRIC CONSTANT |
|---|---|---|---|---|---|
| (Pb,La)-(ZrTi)$O_3$ | 75 - 85 | 1600 | (Pb,La)-(MgNbZrTi)$O_3$ | 100 | 2500 |
| (Pb,Bi)-(ZrTi)$O_3$ | 100 | 2300 | (Pb,Ba)-(LaNb)$O_3$ | 100 | 1700 |
| (Pb,La)-(HfTi)$O_3$ | 75 - 84 | 1300 | (SrBa)-$Nb_2O_3$ | 75 - 85 | 2400 |
| (Pb,Ba)-(ZrTi)$O_3$ | 75 - 80 | 2300 | K(Ta,Nb)$O_3$ | 76 - 87 | 2200 |
| (Pb,Sr)-(ZrTi)$O_3$ | 80 - 85 | 1700 | (Sr,Ba,La)-($Nb_3O_6$) | 80 - 86 | 1900 |
| (Sr,Ca)-(LiNbTi)$O_3$ | 83 - 87 | 3200 | $NaTiO_3$ | 76 - 85 | 1000 |
| $LiTaO_3$ | 75 - 83 | 1200 | $MgTiO_3$ | 70 - 84 | 1100 |
| $SrTiO_3$ | 70 - 80 | 1500 | $BaTiO_3$ | 73 - 84 | 1500 |
| $La_2Ti_2O_7$ | 75 - 83 | 2600 | $SrZrO_3$ | 76 - 83 | 1700 |
| $LiNbO_3$ | 74 - 84 | 1000 | $KNbO_3$ | 75 - 80 | 1100 |

COMPOSITION OF PLASMA DISPLAY PANEL

BACKGROUND OF THE INVENTION

1. Field of the Invention

The present invention relates to a plasma display panel (PDP) and, more particularly, to a composition of plasma display panel.

2. Description of the Background Art

In general, a plasma display panel (PDP) device receives much attention as a next-generation display device together with a thin film transistor (TFT), a liquid crystal display (LCD), an EL (Electro-Luminescence) device, an FED (Field Emission Display) and the like.

The PDP is a display device which uses a luminescent phenomenon according to an energy difference made when red, green and blue fluorescent materials are changed from an excited state to a ground state after being excited by 147 nm of ultraviolet rays which are generated as a He+X3 gas or N3+X3 gas is discharged from a discharge cell isolated by a barrier rib.

Thanks to its properties of facilitation in manufacturing from a simple structure, a high luminance, a high light emitting efficiency, a memory function, a high non-linearity, a 160° or larger optical angular field and the like, the PDP display device is anticipated to occupy a 40" or wider large-scale display device markets.

A structure of the conventional PDP will now be described with reference to FIG. 1.

FIG. 1 is a sectional view showing a structure of a conventional PDP.

As shown in FIG. 1, the conventional PDP includes: a lower insulation layer 20 formed on a lower glass substrate 21; an address electrode 22 formed at a predetermined portion on the lower insulation layer 20; a lower dielectric layer 19 formed on the address electrode 22 and the lower insulation layer 20; an isolation wall 17 defined in a predetermined portion on the lower dielectric layer 19 in order to divide each discharging cell; a black matrix layer 23 formed on the isolation wall 17; a fluorescent layer 18 formed with a predetermined thickness on the side of the black matrix layer 23 and the isolation wall 17 and on the lower dielectric layer 19, and receiving ultraviolet ray and emitting each red, green and blue visible rays; a glass substrate 11; a sustain electrode 12 formed at a predetermined portion on the upper glass substrate 11 in a manner of vertically intersecting the address electrode 22; a bus electrode 12 formed on a predetermined portion on the sustain electrode 12; a first upper dielectric layer 14 formed on the bus electrode 13, the sustain electrode 12 and the upper glass substrate 11; a second upper dielectric layer 15 formed on the first upper dielectric layer 14; and a protection layer (MgO) 16 formed on the second upper dielectric layer 15 in order to protect the second upper dielectric layer 15.

The first and second upper dielectric layers 14 and 15 are called upper dielectric layers.

The operation of the conventional PDP will now be described.

First, as the upper glass substrate 11 and the lower glass substrate 21 of the conventional PDP, an SLS (Soda-Lime Silicate) glass substrate is used.

The lower insulation layer 20 is positioned on the lower glass substrate 21, the SLS glass substrate, and the address electrode 22 is positioned on the lower insulation layer 20.

The lower dielectric layer 19 positioned on the address electrode 22 and the lower insulation layer 20 blocks visible rays emitted toward the lower glass substrate 21.

In order to increase the luminous efficacy, a dielectric layer having a high reflectance is used as the lower dielectric layer 19. The lower dielectric layer 19, a translucent dielectric layer with a reflectance of 60% or above, minimizes loss of light.

The fluorescent layer 18 is formed by laminating in a sequential order of red, green and blue fluorescent materials. A specific wavelength of visible ray is emitted depending on an intensity of an ultraviolet ray according to plasma generated between the isolation walls 17.

Meanwhile, at a lower surface of the upper glass substrate 11, the SLS glass substrate, there are formed the sustain electrode 12 positioned to vertically intersect the address electrode 22 and the bus electrode 13 positioned on the sustain electrode 12. And upper dielectric layers 14 and 15 with an excellent light transmittance are positioned on the bus electrode 13.

The protection layer 16 is positioned on the upper dielectric layer 15 in order to prevent the upper dielectric layer 15 from being damaged due to generation of plasma. Herein, since the first upper dielectric layer 14 is directly contacted with the sustain electrode 12 and the bus electrode 13, it must have a high softening temperature in order to avoid a chemical reaction with the sustain electrode 12 and the bus electrode 13. In addition, since the second upper dielectric layer 15 is expected to have a high smoothness because the protection layer 16 is formed thereon, its softening temperature must be lower by scores of ° C. than the first upper dielectric layer 14.

Commonly, the PDP display device has a problem of jitter occurrence. The jitter phenomenon, which occurs as discharging is delayed for a certain time for a specific applied scan pulse, causes a mis-discharging and interferes a high speed driving.

The jitter phenomenon is affected mainly by a surface state of the protection layer (MgO) and a crystallinity, an electric permittivity (that is, a dielectric constant) and thickness of each layer, a structure and a gap of isolation walls and electrodes, a driving method, a type and a content of a discharging gas, and the like. Especially, Xe has a low diffusion rate in a discharging space, so if the Xe content is increased in order to obtain a high efficacy characteristics, there is higher probability that the jitter phenomenon occurs.

Therefore, in the conventional art, in order to solve the problem of the mis-discharging due to the jitter phenomenon, usually, an electric permittivity of the upper dielectric layer and the lower dielectric layer is increased or their thickness is reduced. In general, the upper dielectric layer and the lower dielectric layer of the PDP has an electric permittivity of about 12~15 range, and especially, in case of the lower dielectric layer, because it contains $TiO_2$ powders for increasing the reflectance, it has a higher electric permittivity.

However, if the electric permittivity is increased by about twice, a discharge voltage is degraded due to the increase in the capacitance, and thus, about 20% of the overall jitter is reduced.

In addition, the jitter characteristics is also changed due to a change in the thickness of the upper dielectric layer and the lower dielectric layer of the PDP. For example, if the gap between the upper electrodes 12 and 13 and the lower electrode 22 narrows as the thickness of the upper dielectric layer and the lower dielectric layer of the PDP is reduced, the discharge voltage would be dropped and thus the jitter can be reduced.

The lower dielectric layer and the upper dielectric layer are made of a material having PbO as a principal component with an electric permittivity of about 12~15, and the gap between the upper electrode and the lower electrode is maintained at about 100 μm.

The fabrication method of the lower dielectric layer 19 and the upper dielectric layers 14 and 15 will now be described in detail.

The lower dielectric layer is formed as follows: Mixed powders, in which scores of % of oxide in a powder state such as $TiO_2$ or $Al_2O_3$ having a particle diameter of below 2 μm is mixed for improving reflection characteristics and controlling an electric permittivity, is mixed with an organic solvent to produce a paste with a viscosity of about 40000~50000 cps, and the paste is printed/fired, thereby forming the lower dielectric layer. In this case, the firing temperature is usually at the range of 550~600° C., and the thickness of the lower dielectric layer is about 20 μm.

The upper dielectric layer is formed as follows: a paste obtained by mixing an organic binder is coated to borosilicate glass (BSG) powder with a size of a particle diameter of 1 μm~2 μm and containing about 40% of Pb in a screen printing method, and then, the coated paste is fired at a temperature of 550° C.~580° C.

Characteristics change in the jitter according to the change in the electric permittivity will now be described with reference to FIGS. 2A and 2B.

FIG. 2A shows jitter occurrence characteristics in case that a distance constant of the upper dielectric layer and the lower dielectric layer for a general PDP is 14, and FIG. 2B illustrates jitter occurrence characteristics in case that a distance constant of the upper dielectric layer and the lower dielectric layer for a general PDP is 25.

As shown in FIGS. 2A and 2B, if the electric permittivity is changed from 14 to 25, an operation speed is increased from 1.25 μs to 1.14 μs due to the increase in the capacitance, and according to which the overall jitter is reduced by about 11%.

However, since a withstand voltage is reduced according to the increase in the electric permittivity, there is a limitation in increasing the electric permittivity of the PbO-based dielectric material (the material of the upper dielectric layer and the lower dielectric layer).

In addition, in the case of increasing the capacitance by reducing the thickness of the material having the same electric permittivity, a problem arises that the conventional dielectric can not withstand the withstand voltage of about 560V.

To sum up, as stated above, the dielectric layer of the conventional PDP has the following problem.

That is, since the dielectric layer is made of the PbO-based dielectric material, if the electric permittivity of the dielectric is increased in order to reduce the jitter, the withstand voltage would be reduced. Thus, the electric permittivity of the dielectric can not be increased to its maximum.

In addition, if the thickness of the upper dielectric layer and the lower dielectric layer is reduced, the withstand voltage would be lowered down, causing the problem that jitter can not be effectively reduced, and thus, a high speed driving is hardly performed.

Other conventional PDPs and their fabrication methods are disclosed in the U.S. Pat. No. 5,838,106 issued on Nov. 17, 1998, a U.S. Pat. No. 6,242,859 issued on Jun. 5, 2001, and a U.S. Pat. No. 6,599,851 issued on Jul. 29, 2003.

SUMMARY OF THE INVENTION

Therefore, one object of the present invention is to provide a composition of a plasma display panel (PDP) capable of effectively reducing a jitter.

Another object of the present invention is to provide a composition of a PDP capable of preventing jitter occurrence and mis-discharging by increasing an electric permittivity of a dielectric to its maximum and increasing a capacitance.

Still another object of the present invention is to provide a composition of a PDP capable of heightening a luminance and an efficiency by reflecting a portion of a visible ray radiated from a fluorescent material.

To achieve these and other advantages and in accordance with the purpose of the present invention, as embodied and broadly described herein, there is provided a composition of a PDP containing a ferroelectric transparent ceramics material.

To achieve the above object, there is also provided a composition of a PDP, including: a lower dielectric layer containing a ferroelectric transparent ceramics material; an upper dielectric layer containing the ferroelectric transparent ceramics material; and a fluorescent material with the ferroelectric transparent ceramics material mixed therein or having a ferroelectric transparent ceramics thin film.

To achieve the above object, there is also provided a ferroelectric transparent ceramics material contained in a composition of a PDP is at least one of $(Pb—La)(ZrTi)O_3$, $(Pb,Bi)—(ZrTi)O_3$, $(Pb,La)—(HfTi)O_3$, $(Pb,Ba)—(ZrTi)O_3$, $(Sr,Ca)—(LiNbTi)O_3$, $LiTaO_3$, $SrTiO_3$, $La2Ti_2O_7$, $LiNbO_3$, $(Pb,La)—(MgNbZtTi)O_3$, $(Pb,Ba)—(LaNb)O_3$, $(Sr,Ba)—Nb_2O_3$, $K(Ta,Nb)O_3$, $(Sr,Ba,La)—(Nb_2O_6)$, $NaTiO_3$, $MgTiO_3$, $BaTiO_3$, $SrZrO_3$ or $KnbO_3$.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 illustrates ferroelectric transparent ceramics materials applied in the present invention and their characteristics.

DETAILED DESCRIPTION OF THE PREFERRED EMBODIMENTS

Figure 1:
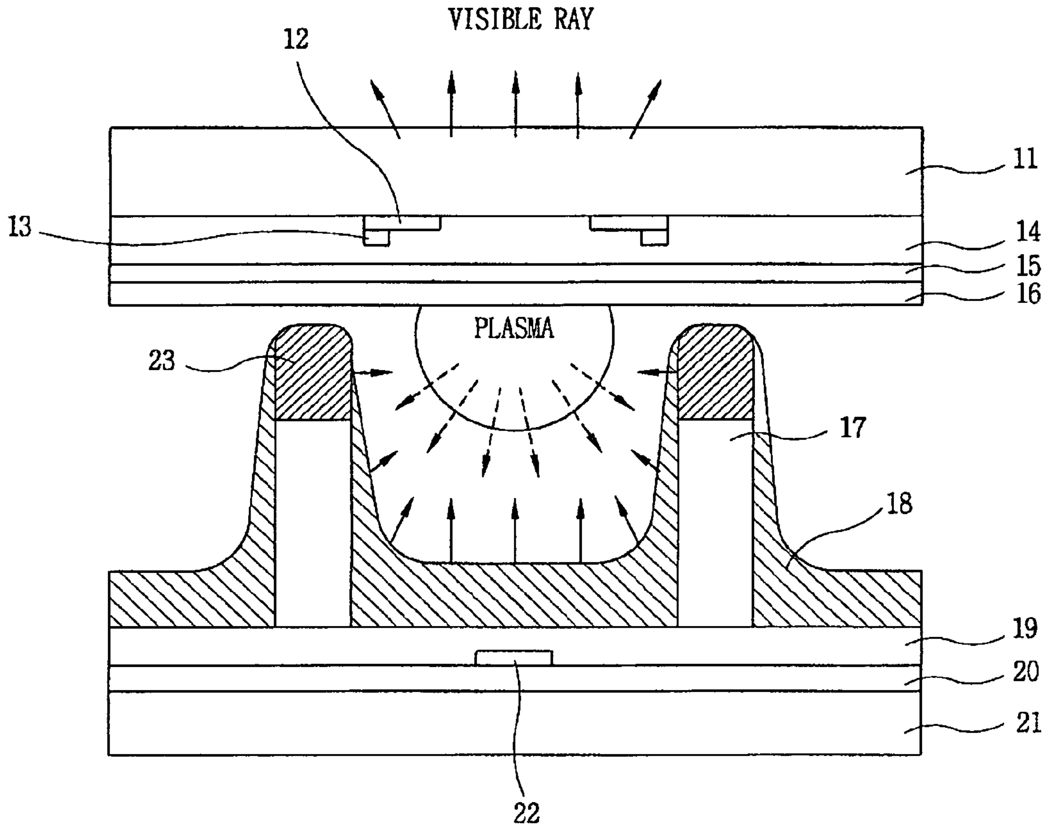
FIG. 1 PRIOR ART
FIG. 1 is a sectional view showing a structure of a PDP in accordance with a conventional art.
Figure 2A:
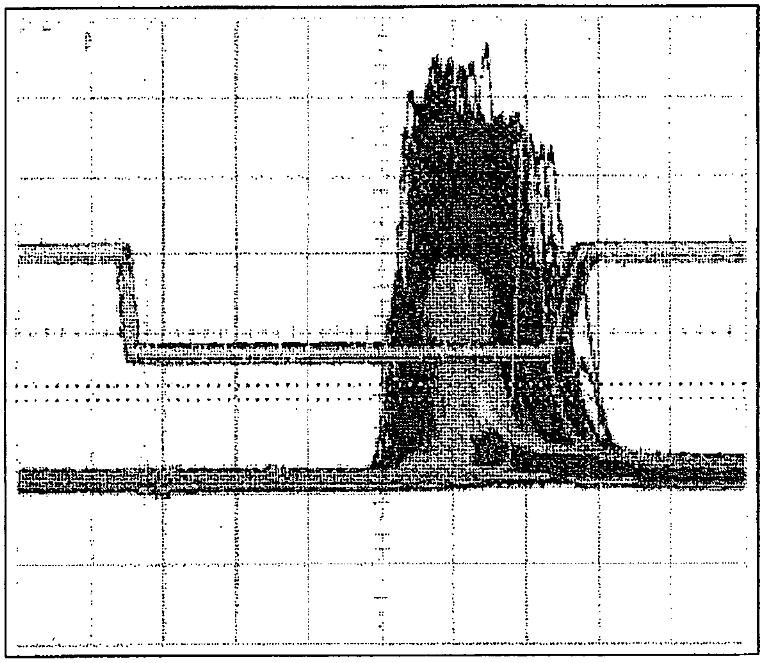
FIG. 2A PRIOR ART
FIG. 2A shows jitter occurrence characteristics in case that a distance constant of the upper dielectric layer and the lower dielectric layer for a general PDP is 14.
Figure 2B:
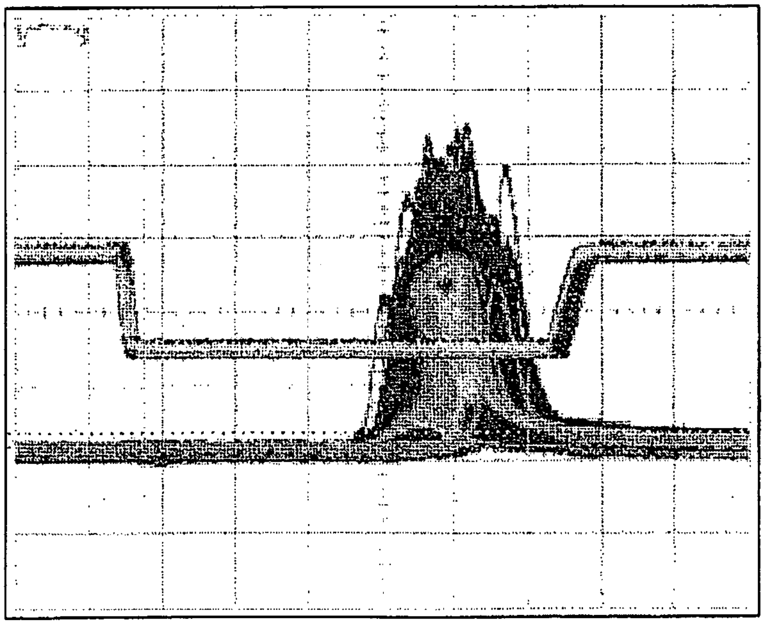
FIG. 2B PRIOR ART
FIG. 2B illustrates jitter occurrence characteristics in case that a distance constant of the upper dielectric layer and the lower dielectric layer for a general PDP is 25.

Reference will now be made in detail to the preferred embodiments of the present invention, examples of which are illustrated in the accompanying drawings.

A preferred embodiment of a composition of a PDP that is capable of effectively reducing a jitter by containing a ferroelectric transparent ceramics material thereto will now be described.

Namely, preferred embodiments of a composition of a PDP capable of increasing an electric permittivity of a dielectric of a PDP to its maximum by containing the ferroelectric transparent ceramics material, preventing a jitter occurrence and a mis-discharging by increasing a capacitance, and improving a luminance and an efficiency by reflecting a portion of a visible ray radiated from a fluorescent material, will now be described.

Herein, increase in the capacitance would lead to reduction of a jitter, which results in preventing of a mis-discharging generated when the PDP is at a low temperature or at a high temperature.

In addition, in the present invention, a ferroelectric transparent ceramics material having a high withstand voltage, a high electric permittivity (more than 1000), and a high dielectric strength is applied to the upper and lower dielectrics constituting the PDP device, to thereby increasing a capacitance and enhancing a resistance.

Moreover, the ferroelectric transparent ceramics material is also applied to a fluorescent material in order to increase the capacitance, and a visible ray reflection is induced to increase luminance and efficiency of the PDP.

Preferably, the PDP comprises a dielectric layer and a phosphor layer including a ferroelectric transparent ceramics material.

FIG. 3 illustrates ferroelectric transparent ceramics materials applied in the present invention and their characteristics.

The materials as shown in FIG. 3 has a 1000 or higher electric permittivity, a 70% or higher visible ray transmittance, and a $10^6$/m or higher dielectric strength (not shown). Herein, since the electric permittivity, the ferroelectric transparent ceramics material applied in the present invention is higher than 1000, the jitter can be effectively reduced even with the less amount of ferroelectric transparent ceramics material.

Among the materials, (Pb, Bi)—$(ZrTi)O_3$, (Pb, La)—$(MgNbZrTi)O_3$, (Pb,Ba)—$(LaNb)O_3$ are transparent materials with a transmittance of almost 100% while having the high electric permittivity (higher than 1700), so they can be also applied to the upper dielectric of the PDP device.

Various embodiments in which the ferroelectric transparent ceramics material is applied to the PDP to reduce the jitter and thus prevent mis-discharging will now be described.

First Embodiment

In the first embodiment, at least one of ferroelectric transparent ceramics materials of FIG. 3 is applied to the lower dielectric of the PDP. And the ferroelectric transparent ceramics powder is mixed in the conventional lower dielectric material or a ferroelectric transparent ceramics thin film is additionally formed on the conventional lower dielectric layer to increase a capacitance.

First, ferroelectric transparent ceramics powder is prepared and mixed to the lower dielectric material.

When the ferroelectric transparent ceramics powder is mixed in the lower dielectric material, the ferroelectric transparent ceramics powder with a particle diameter of a few μm is mixed in a range of 1 weight %~20 weight % in parent glass powder. The ratio of the lower dielectric composition has been obtained by assuming the weight of the lower dielectric layer is 100 wt %.

Thereafter, the mixed powder is formed to a paste with a viscosity of about 40000~50000, which is then printed and fired to form the lower dielectric layer.

When a ferroelectric transparent ceramics thin film is formed on the lower dielectric layer, a lower dielectric layer is formed thinner than the thickness of the conventional lower dielectric layer and the ferroelectric transparent ceramics material is coated with a thickness of thousands of Å at the surface of the thin lower dielectric layer or embedded in the lower dielectric layer by E-beam or sputtering.

Namely, by forming the ferroelectric transparent ceramics thin film on the lower dielectric layer, the electric permittivity of the lower dielectric can be improved.

In addition, by firing the ferroelectric transparent ceramics powder, the dielectric tissue can become denser, so that a life span of the device can be increased.

Second Embodiment

In a second embodiment of the present invention, at least one of ferroelectric transparent ceramics materials shown in FIG. 3 is applied to the upper dielectric of the PDP. In addition, the ferroelectric transparent ceramics powder is mixed in the conventional upper dielectric material or a ferroelectric transparent ceramics thin film is additionally formed on the conventional upper dielectric layer in order to increase a capacitance.

First, ferroelectric transparent ceramics powder is prepared and mixed to the upper dielectric material.

When the ferroelectric transparent ceramics powder is mixed in the lower dielectric material, the ferroelectric transparent ceramics powder with a particle diameter of a few nm is mixed in a range of 1 wt %~5 wt % in parent glass powder. The ratio of the upper dielectric composition has been obtained by assuming the weight of the upper dielectric layer is 100 wt %.

Thereafter, the mixed powder is formed to a paste with a viscosity of about 40000~50000, which is then printed and fired to form the lower dielectric layer.

A ferroelectric transparent ceramics thin film is formed in the same manner as in the conventional art. That is, an upper dielectric layer is formed, on which the ferroelectric transparent ceramics material is coated with a thickness of scores of ~hundreds of Å. Namely, by forming the ferroelectric transparent ceramics thin film on the upper dielectric layer, the electric permittivity of the upper dielectric can be improved.

Preferably, the ferroelectric transparent ceramics material used to heighten the electric permittivity of the upper dielectric is selected from the group consisting of (Pb,Bi)—$(ZrTi)O_3$, (Pb,La)—$(MgNbZrTi)O_3$, (Pb,Ba)—$(LaNb)O_3$ which have an extremely high transparent.

Third Embodiment

In the third embodiment of the present invention, at least one of ferroelectric transparent ceramics material shown in FIG. 3 is applied to a fluorescent material of the PDP. The ferroelectric transparent ceramics material is mixed in power form to a conventional fluorescent material or a ferroelectric transparent ceramics thin film is additionally formed on the conventional fluorescent material, to thereby increasing a capacitance.

First, ferroelectric transparent ceramics powder is prepared and mixed to the fluorescent material.

When the ferroelectric transparent ceramics powder is mixed to the fluorescent material, the fine ferroelectric transparent ceramics powder with a particle diameter of a few nm is mixed in a range of 1 wt %~10 wt % in the fluorescent material powder. The ratio of the fluorescent material composition has been obtained by assuming the weight of the fluorescent layer is 100 wt %.

When the ferroelectric transparent ceramics thin film is formed on the fluorescent layer, the ferroelectric transparent ceramics thin film is formed with a thickness of below 100 Å at the surface of the conventional fluorescent layer in an E-beam or a Sol-Gel method. That is, with the ferroelectric transparent ceramics thin film thereon, the fluorescent material can discharge a secondary electron and increase a surface charge, so that a mis-discharge occurrence can be reduced.

In this respect, if the ferroelectric transparent ceramics thin film is too thick, the ferroelectric transparent ceramics thin film is to absorb ultraviolet rays, reducing the luminance of the PDP. Thus, it is preferred that the ferroelectric transparent ceramics thin film has the thickness of below 100 Å.

In the present invention, by applying one of the first to third embodiment to the PDP, the electric permittivity of the PDP device can be increased, and accordingly, the capacitance can be also increased. In addition, because the ferroelectric transparent ceramics material used in the present invention has a high dielectric strength, a discharge withstand voltage can be heightened. Therefore, as the capacitance is increased, the jitter can be reduced, and thus, a mis-discharge occurrence rate can be reduced.

Moreover, because the ferroelectric transparent ceramics material can reflect a portion of the visible ray radiated from the fluorescent material, the strength of the discharged visible ray can be increased.

As so far described, by mixing the ferroelectric transparent ceramics powder to the upper dielectric or/and lower dielectric material or by forming the ferroelectric transparent ceramics thin film on the upper dielectric or/and lower dielectric, the electric permittivity of the upper and lower dielectric can be heightened.

In addition, because the electric permittivity of the upper and lower dielectric is heightened, the capacitance is increased, the jitter is reduced, and the mis-discharge occurrence rate can be considerably reduced.

Moreover, by mixing the ferroelectric transparent ceramics powder to the fluorescent material or by forming the ferroelectric transparent ceramics thin film on the fluorescent material, the visible ray radiated from the fluorescent material can be partially reflected, so that the luminance and efficiency of the PDP can be also enhanced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A plasma display panel (PDP) comprising a dielectric layer and a phosphor layer, the phosphor layer (PDP) comprising a phosphor layer including a ferroelectric transparent ceramics material, wherein the phosphor layer of the PDP is formed by mixing a ferroelectric transparent ceramics powder with a phosphor powder.

2. The plasma display panel (PDP) of claim 1, wherein a lower dielectric layer of the PDP is formed such that the ferroelectric transparent ceramics powder is mixed in the range of 1 wt %~20 wt % to a parent glass powder, wherein a mix of the ferroelectric transparent ceramics powder and the parent glass powder is printed and fired.

3. The plasma display panel (PDP) of claim 1, further comprising: an upper dielectric layer containing the ferroelectric transparent ceramics material.

4. The plasma display panel (PDP) of claim 3, wherein the upper dielectric layer is formed such that at least one powder of (Pb,Bi)—$(ZrTi)O_3$, (Pb,La)—$(MgNbZrTi)O_3$, (Pb,Ba)—$(LaNb)O_3$ is mixed in the range of 1 wt %~5 wt % to a parent glass powder, and the mixed powder is printed and fired.

5. The plasma display panel (PDP) of claim 3, wherein at least one thin film of (Pb,Bi)—$(ZrTi)O_3$, (Pb,La)—$(MgNbZrTi)O_3$, (Pb,Ba)—$(LaNb)O_3$ is formed at a surface of the upper dielectric layer.

6. The plasma display panel (PDP) of claim 1, wherein the phosphor layer of the PDP is formed by mixing the ferroelectric transparent ceramics powder of a few nm in the range of 1 wt %~10 wt % to the phosphor powder.

7. The plasma display panel (PDP) of claim 1, wherein the ferroelectric transparent ceramics material has a 70% or more visible ray transmittance and a 1000 or more electric permittivity.

8. The plasma display panel (PDP) of claim 1, wherein a composition of the ferroelectric transparent ceramics material is at least one selected from the group consisting of (Pb—La)$(ZrTi)O_3$, (Pb,Bi)—$(ZrTi)O_3$, (Pb,La)—$(HfTi)O_3$, (Pb,Ba)—$(ZrTi)O_3$, (Sr,Ca)—$(LiNbTi)O_3$, $LiTaO_3$, $SrTiO_3$, $La2Ti_2O_7$, $LiNbO_3$, (Pb,La)—$(MgNbZtTi)O_3$, (Pb,Ba)—$(LaNb)O_3$, (Sr,Ba)—$Nb_2O_3$, $K(Ta,Nb)O_3$, (Sr,Ba,La)—$(Nb_2O_6)$, $NaTiO_3$, $MgTiO_3$, $BaTiO_3$, $SrZrO_3$ or $KnbO_3$.

9. The plasma display panel (PDP) of claim 1, further comprising:

a lower dielectric layer including the ferroelectric transparent ceramics material; and an upper dielectric layer including the ferroelectric transparent ceramics material.

10. The plasma display panel (PDP) of claim 1, further comprising a lower dielectric layer including the ferroelectric transparent ceramics powder.

11. A plasma display panel (PDP) comprising:

a lower dielectric layer containing a ferroelectric transparent ceramics material;

an upper dielectric layer containing the ferroelectric transparent ceramics material; and a phosphor layer containing the ferroelectric transparent ceramics material or having a ferroelectric transparent ceramics thin film, wherein the phosphor layer of the PDP is formed by mixing the ferroelectric transparent ceramics material with a phosphor powder.

12. The plasma display panel (PDP) of claim 11, wherein the ferroelectric transparent ceramics material has a 70 or more visible ray transmittance and a 1000 or more electric permittivity.

13. The plasma display panel (PDP) of claim 11, wherein the ferroelectric transparent ceramics material is at least one selected from the group consisting of (Pb—La)$(ZrTi)O_3$, (Pb,Bi)—$(ZrTi)O_3$, (Pb,La)—$(HfTi)O_3$, (Pb,Ba)—(ZrTi)

$O_3$, (Sr,Ca)—(LiNbTi)$O_3$, $LiTaO_3$, $SrTiO_3$, La2$Ti_2O_7$, $LiNbO_3$, (Pb,La)—(MgNbZtTi)$O_3$, (Pb,Ba)—(LaNb)$O_3$, (Sr,Ba)—$Nb_2O_3$, K(Ta,Nb)$O_3$, (Sr,Ba,La)—($Nb_2O_6$), $NaTiO_3$, $MgTiO_3$, $BaTiO_3$, $SrZrO_3$ or $KnbO_3$.

14. The plasma display panel (PDP) of claim 11, wherein the lower dielectric layer is formed such that a ferroelectric transparent ceramics powder is mixed in the range of 1 wt %~20 wt % to a parent glass powder, wherein mix of the ferroelectric transparent ceramics powder and the parent glass powder is printed and fired.

15. The plasma display panel (PDP) of claim 11, wherein the ferroelectric transparent ceramics thin film is formed at a surface of the lower dielectric layer or embedded in the lower dielectric layer.

16. The plasma display panel (PDP) of claim 11, wherein the upper dielectric layer is formed such that at least one powder of (Pb,Bi)—(ZrTi)$O_3$, (Pb,La)—(MgNbZrTi)$O_3$, (Pb,Ba)—(LaNb)$O_3$ is mixed in the range of 1 wt %~5 wt % to a parent glass powder, and the mixed powder is printed and fired.

17. The plasma display panel (PDP) of claim 11, wherein at least one thin film of (Pb,Bi)—(ZrTi)$O_3$, (Pb,La)—(MgNbZrTi)$O_3$, (Pb,Ba)—(LaNb)$O_3$ is formed at a surface of the upper dielectric layer.

18. The plasma display panel (PDP) of claim 11, wherein the phosphor layer of the PDP is formed by mixing ferroelectric transparent ceramics powder of a few nm in the range of 1 wt %~10 wt % to the phosphor powder.

19. The plasma display panel (PDP) of claim 11, wherein the ferroelectric transparent ceramics thin film is formed with a thickness of below 100 Å at a surface of the phosphor layer.

* * * * *